United States Patent
Sawai (10) Patent No.: US 6,906,111 B2
(45) Date of Patent: Jun. 14, 2005

(54) FOAMED ARTICLE (75) Inventor: Minoru Sawai, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/434,267

(22) Filed: May 9, 2003

(65) Prior Publication Data

US 2004/0029987 A1 Feb. 12, 2004

(30) Foreign Application Priority Data

May 10, 2002 (JP) .......................................... 2002-135935
Sep. 20, 2002 (JP) .......................................... 2002-275322

(51) Int. Cl.$^7$ .............................................. C08G 18/28

(52) U.S. Cl. ........................................ 521/170; 521/174

(58) Field of Search ................................. 521/170, 174

(56) References Cited

U.S. PATENT DOCUMENTS

| 6,008,263 A | * | 12/1999 | Thompson et al. | ......... 521/174 |
| 6,201,035 B1 | * | 3/2001 | Tuinman et al. | ............ 521/174 |
| 6,204,300 B1 | | 3/2001 | Kageoka et al. | |
| 6,291,538 B1 | | 9/2001 | Okubo et al. | |

FOREIGN PATENT DOCUMENTS

| JP | 3121116 A | 5/1991 |
| JP | 2002047330 A | 2/2002 |

* cited by examiner

Primary Examiner—John M. Cooney, Jr.
(74) Attorney, Agent, or Firm—Birch, Stewart, Kolasch & Birch, LLP (57) ABSTRACT A foamed article having a density of at least 0.1 g/cm$^3$, a single glass transition temperature within the temperature range of −20° to 60° C., a storage modulus (E') of 0.5 to 2 MPa and tan δ of 0.16 to 0.5 as obtained from dynamic viscoelasticity at a frequency of 10 Hz and a temperature of 25° C. The foamed article can be used for a member for shoe soles, a shoe sole and the like.

13 Claims, 3 Drawing Sheets

FOAMED ARTICLE

BACKGROUND OF THE INVENTION

1. Field of the Invention

The present invention relates to a foamed article. More specifically, the present invention relates to a foamed article which can be suitably used as, for instance, shoe soles and cushioning materials for automobiles and other vehicles, furniture and bedding, and the like.

Furthermore, the present invention relates to a process for preparing a polyurethane foam. More specifically, the present invention relates to a process for preparing a polyurethane foam, which can be suitably used as shoe soles, especially low-density soles, and the like.

2. Discussion of the Related Art

Foamed articles represented by polyurethane foams have been widely used in various fields. In general, properties required for foamed articles differ depending upon their purpose of use or sites used. From the viewpoints of safety, comfortable fitting and feel, there has been developed a polyurethane foam which has sufficient strength, soft and excellent feel, and low rebound resilience as the properties. However, there has not yet been produced a foamed article having sufficient strength, and simultaneously satisfying soft and excellent feel and low rebound resilience.

For instance, Japanese Patent Laid-Open No. 2002-47330 discloses a low-resilient polyurethane foam having excellent elongation and tensile strength. However, there are some defects in the polyurethane foam, such that the polyurethane foam has high storage modulus (E') in dynamic viscoelasticity and does not have soft and excellent feel, nevertheless high strength and low resilience are satisfied.

In addition, Japanese Patent Laid Open No. Hei 11-286566 discloses a polyurethane foam having low resilience. However, there is a defect in this polyurethane foam, such that the polyurethane foam does not have sufficient hardness and strength at room temperature.

A polyether-based polyurethane has been used for shoe soles since the polyether-based polyurethane is excellent in hydrolytic resistance as compared to a polyester-based polyurethane.

However, there is a defect in the shoe sole made of the polyether-based polyurethane, such that the shoe sole has low mechanical strength when the shoe sole is made lighter in order that the shoes are fit more comfortably.

Japanese Patent Laid-Open No. Hei 3-121116 discloses a polyurethane composition for shoe soles, comprising a polyether-polyol, a chain extender, a blowing agent and an isocyanate or a terminal-diisocyanate prepolymer made of a compound having two active hydrogens and a diisocyanate, wherein the polyether-polyol has a molecular weight of 2000 to 10000. However, this document does not suggest a process for improving dimensional change with advancement of lighter weight at all.

Japanese Patent Laid-Open No. 2000-290345 discloses a process for preparing a polyurethane foam for shoe soles, comprising reacting a polyol composition comprising a polyol component comprising a polyoxypropylene glycol prepared from a compound having two hydroxyl groups as a starting material, and having a degree of unsaturation of at most 0.06 meq./g, a catalyst and water, with a polyisocyanate compound, wherein the polyurethane foam has a density of a formed article of 0.2 to 1.0 g/cm$^3$ and C hardness of 35 to 90. However, this document does not suggest a process for improving dimensional stability with advancement of lighter weight at all.

An object of the present invention is to provide a foamed article having sufficient strength, and simultaneously satisfying soft and excellent feel and low rebound resilience.

Another object of the present invention is to provide a polyurethane foam made of a polyether-based polyurethane, which has sufficient strength even at low density and is excellent in dimensional stability, and to provide a shoe sole and a shoe having the shoe sole as applications which make good use of the features of the polyurethane foam.

These and other objects of the present invention will be apparent from the following description.

SUMMARY OF THE INVENTION

According to the present invention, there are provided:

(1) a foamed article having a density of at least 0.1 g/cm$^3$, a single glass transition temperature within the temperature range of –20° to 60° C., a storage modulus (E') of 0.5 to 2 MPa and tan δ of 0.16 to 0.5 as obtained from dynamic viscoelasticity at a frequency of 10 Hz and a temperature of 25° C., a member for shoe soles made of the foamed article, a shoe sole comprising the foamed article, and a shoe having the shoe sole;

(2) a foamed article for shoe soles having a density of at least 0.1 g/cm$^3$, a storage modulus (E') of 0.5 to 2 MPa and tan δ of 0.16 to 0.5 as obtained from dynamic viscoelasticity at a frequency of 10 Hz and a temperature of 25° C.;

(3) a process for preparing a polyurethane foam comprising: reacting a polyol component comprising a polyether-polyol having two functional groups and a number-average molecular weight of 3000 to 5000 and a polyether-polyol having three functional groups and a number-average molecular weight of 4000 to 5500 with an isocyanate compound, wherein the weight ratio of polyether-polyol having two functional groups/the polyether-polyol having three functional groups is 35/65 to 65/35; and (4) a polyurethane foam having a density of at least 0.1 g/cm$^3$, a single glass transition temperature within the temperature range of –20° to 60° C., a storage modulus (E') of 0.5 to 2 MPa and tan δ of 0.16 to 0.5 as obtained from dynamic viscoelasticity at a frequency of 10 Hz and a temperature of 25° C., the polyurethane foam being obtained by reacting a polyol component comprising a polyether-polyol having two functional groups and a number-average molecular weight of 3000 to 5000 and a polyether-polyol having three functional groups and a number-average molecular weight of 4000 to 5500 with an isocyanate compound, wherein the weight ratio of polyether-polyol having two functional groups/the polyether-polyol having three functional groups is 35/65 to 65/35.

DETAILED DESCRIPTION OF THE INVENTION

The foamed article of the present invention has storage modulus (E') (hereinafter simply referred to as "storage modulus") of 0.5 to 2 MPa and tan δ of 0.16 to 0.5 as obtained from dynamic viscoelasticity determined at a frequency of 10 Hz and a temperature of 25° C. on the basis of a test method prescribed in JIS K 7198. Therefore, the foamed article has sufficient strength and exhibits excellent effects such as simultaneously soft and excellent feel and low rebound resilience.

The present invention has been accomplished to provide a foamed article exhibiting excellent effects such as simultaneously soft and excellent feel and low rebound resilience. There has been found out that storage modulus and tan δ at 25° C., which reveals the ratio of loss modulus to storage modulus, have correlations between feel felt by human and low rebound resilience. In other words, when feel is evaluated by finger touch and storage modulus, it has been found that there can be obtained a foamed article having sufficient strength, soft and excellent feel, and low rebound resilience within the temperature range of −5° to 40° C., which is a general living temperature at which human carries on living throughout one year when storage modulus and tan δ fall within specified ranges, as determined at 25° C., frequency of 10 Hz and a heating rate of 2° C./minute. Therefore, the foamed article of the present invention is appropriately defined by a specified storage modulus and specified tan δ.

The temperature of 25° C. and frequency of 10 Hz, which are the conditions during the determination of dynamic viscoelasticity, are set on the bases that an average temperature which human experiences in daily life is 25° C. or so, and that a characteristic frequency that the shoe sole is subjected to is 5 to 10 Hz when human puts on shoes having shoe soles made of the foamed article, and walks, jogs, or runs at full speed.

The term "soft feel" as referred to herein means a feel in which when a foamed article is directly pressed or picked up at a tip end of finger nail or its vicinity or at a part having fingerprints, a foamed article is smashed without feeling the hardness like in stone, but is comfortable to a degree that does not feel the bottom of the soles.

Also, the term "low rebound resilience" as referred to herein means that a modulus of repulsion elasticity is at most 35%, as determined at a temperature of 25° C. using a foamed article having a diameter of 32 mm and a thickness of 10 mm on the basis of impact resilience test as prescribed in JIS K 6301.

Dynamic viscoelasticity is a combination behavior of viscosity and elasticity when a constant sine wave strain is applied to a foamed article. Dynamic viscoelasticity is obtained by determining stress to strain, or strain to stress.

Complex modulus is a ratio of a maximum stress to a maximum strain in dynamic viscoelasticity, which is obtained by complex number computation as a vector. A part of real number of the complex modulus showing a size of stress components of a phase when a sine wave strain at a characteristic frequency is applied is defined as storage modulus (dynamic storage modulus). A part of imaginary number of the complex modulus showing a size of stress components having a phase shift of π/2 from the strain when a sine wave strain having a characteristic frequency is applied is defined as loss modulus (dynamic loss modulus).

The tan δ is also referred to as loss tangent, and expressed by the equation:

[tan δ]=[Loss Modulus]/[Storage Modulus].

The tan δ has been used as a measure of energy absorbability of a foamed article. In the determination of the temperature change in dynamic viscoelasticity, there can be known transition from a glassy state to a rubbery state, relaxation phenomenon of impact energy applied from the external or the like from dispersion of storage modulus and absorption of loss modulus by keeping a frequency during determination at a constant level, and obtaining storage modulus, loss modulus and tan δ as a function of temperature.

When the storage modulus is within the range of 0.5 to 2 MPa, preferably 0.5 to 1.8 MPa, more preferably 0.5 to 1.6 MPa, still more preferably 0.6 to 1.3 MPa, there is obtained a foamed article having sufficient strength and soft and excellent feel. In other words, when the storage modulus is smaller than the above-mentioned lower limit, the foamed article not only becomes too soft and does not have excellent feel, but also has lowered mechanical strength. On the other hand, when the storage modulus is larger than the above-mentioned upper limit, the foamed article becomes harder and does not have soft feel.

When tan δ is within the range of 0.16 to 0.5, preferably 0.18 to 0.46, more preferably 0.18 to 0.40, still more preferably 0.18 to 0.35, there is obtained a foamed article having low rebound resilience and shape restorability. In other words, if tan δ is smaller than the above-mentioned lower limit, the foamed article does not have sufficient low rebound resilience when an external force is applied. On the other hand, if tan δ is larger than the above-mentioned upper limit, an original shape is not easily recovered when the foamed article is deformed by application of an external force, so that soft and excellent feel is not obtained.

One of great features of the foamed article of the present invention resides in that the foamed article has a single glass transition temperature within the temperature range of −20° to 60° C. Since the foamed article has the above feature, crystallinity and orientation of the polymer used in the foamed article are not lowered, so that it is thought that the foamed article has sufficient strength and low rebound resilience within the temperature range of −5° to 40° C. When a foamed article has a glass transition temperature of lower than −20° C., since the foamed article is in the condition such that molecular motion can be conducted under low energy, crystallinity and orientation of the polymer constituting the foamed article are lowered, so that it would be difficult to satisfy both strength and low rebound resilience of a foamed article.

The temperature range of the glass transition temperature is −20° to 60° C., preferably −15° to 60° C., more preferably −10° to 60° C., still more preferably −10° to 30° C., especially preferably 0° to 25° C., from the viewpoint of exhibiting sufficient strength and low rebound resilience in the temperature range of −5° to 40° C.

The term "glass transition temperature" as referred to herein is a temperature at which a foamed article undergoes glass transition, i.e. a temperature at which a foamed article undergoes change of states from glassy state to rubber-like state. Specifically, dynamic viscoelasticity is determined at a frequency of 10 Hz, with varying temperatures within the temperature range of −20° to 60° C., and a peak temperature of tan δ obtained from the dynamic viscoelasticity is defined as a glass transition temperature.

In addition, the peak value of tan δ means an inflection point (maximal value) in a case where tan δ is subjected to transition from increase to decrease when temperature is raised from a low temperature (for instance, −70° C.) to a high temperature (for instance, 60° C.), and this inflection point (maximal value) does not include a fine change caused by noise.

Figure 1:
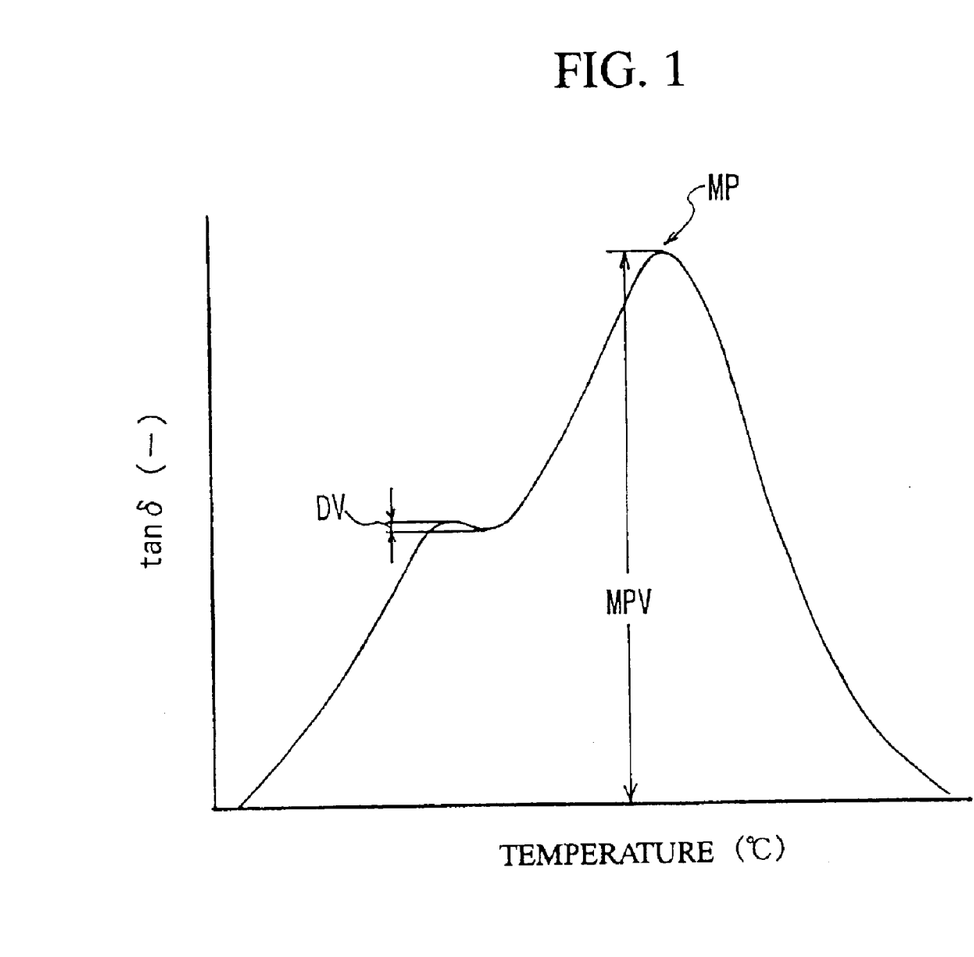
FIG. 1 is a graph showing temperature change in tan δ of a foamed article.

Further, as shown in FIG. 1 showing temperature changes of tan δ, among the peak values of tan δ, the peak showing the highest value is defined as a main peak (MP), and its peak value of tan δ is defined as MPV. There may exist fine changes having a fine change (DV) of at most 0.03, and satisfying the value of DV/MPV of at most 0.1. The value of DV/MPV is preferably at most 0.07. In the present invention, it is considered that there is a single glass transition temperature even if there exist fine peaks as described above other than the glass transition temperature defined by the above-mentioned peak temperature of tan δ. It is preferable that such fine changes do not exist.

The peak value of tan δ in the foamed article of the present invention is preferably 0.25 to 1, more preferably 0.3 to 1, from the viewpoint of exhibiting low rebound resilience.

The modulus of repulsion elasticity of the foamed article is preferably at most 35%, more preferably at most 32%, still more preferably at most 30%, as determined by using a foamed article having a thickness of 10 mm and a diameter of 32 mm at a temperature of 25° C. on the basis of the determination method as prescribed in JIS K 6301, from the viewpoint of absorbing impact energy applied from the external. In addition, the modulus of repulsion elasticity is preferably at least 10%, more preferably at least 12%, still more preferably at least 15%, from the viewpoint of making it more easily restorable to its original shape when deformed by application of an external force. From these viewpoints, the modulus of repulsion elasticity of the foamed article is preferably 10 to 35%, more preferably 12 to 32%, still more preferably 15 to 30%.

In addition, the tensile strength of the foamed article is preferably at least 0.98 MPa, more preferably at least 1.18 MPa, still more preferably at least 1.47 MPa, as determined by using a test piece having a dumbbell shape No. 2 and being punched out from a polyurethane foam having a thickness of 10 mm at 25° C. in accordance with JIS K 6301, from the viewpoint of obtaining sufficient mechanical strength and durability.

The raw material used in the foamed article of the present invention includes polyurethanes having self-foamability, rubbers, polyvinyl chloride, ethylene-vinyl acetate copolymers, olefinic resins, styrenic resins and the like. When a rubber, a polyvinyl chloride, an ethylene-vinyl acetate copolymer, an olefinic resin, a styrenic resin or the like is used, there can be employed a process comprising foaming a pre-foamed particle prepared by previously foaming these resins; a process comprising immersing a blowing agent in the resin and foaming the resin in a mold; and the like.

The case where the foamed article is made of a representative polyurethane foam will be explained hereinbelow.

The polyurethane foam having given storage modulus and tan δ of the present invention can be obtained by mixing in proper amounts a polyol (a), a chain extender (b), a polyisocyanate compound (c), a catalyst (d) and a blowing agent (e) to react the components, and controlling the ratio of a soft segment to a hard segment constituting a polyurethane foam.

The polyurethane foam comprises a soft segment made of a polyol, and a hard segment made of an aggregate containing urethane bond or urea bond having high bond energy. Since the behavior of dynamic viscoelasticity caused by this hard segment gives influences to the storage modulus and tan δ within the temperature range of −5° to 40° C., it is important to control this behavior.

It is preferable that the polyol is at least one member selected from the group consisting of a polyether-polyol having at least two hydroxyl groups (hereinafter simply referred to as "polyether-polyol"), a polymer-polyol comprising the polyether-polyol as a base material (hereinafter simply referred to as "polymer-polyol") and a polyester-polyol.

The polyether-polyol includes a polyether-polyol obtained by subjecting a polyhydric alcohol such as ethylene glycol, propylene glycol, 1,4-butanediol, neopentyl glycol, 1,6-hexanediol, glycerol, trimethylolpropane, 1,2,6-hexanetriol or pentaerythritol to addition polymerization of an alkylene oxide; a polyoxytetramethylene glycol; and the like.

Representative examples of the polyether-polyol include a polyoxypropylene-based polyol having a molecular weight of at least 1500 per one hydroxyl group, obtained by adding ethylene oxide to a terminal hydroxyl group of the polyoxypropylene-polyol; a polyoxytetramethylene glycol having a molecular weight of at least 1000 obtained by ring-opening polymerization of tetrahydrofuran; a mixture thereof; and the like.

Representative examples of the polymer-polyol include one in which fine polymer particles obtained by polymerizing a polymerizable unsaturated group-containing monomer are dispersed in a polyether-polyol; and the like. The polymer-polyol can be prepared, for instance, by a process comprising mixing fine polymer particles obtained by polymerizing a polymerizable unsaturated group-containing monomer with a polyether-polyol, thereby dispersing the fine polymer particles in the polyether-polyol; a process comprising polymerizing the above-mentioned polymerizable unsaturated group-containing monomer in the above-mentioned polyether-polyol, thereby giving fine polymer particles obtained from the above-mentioned polymerizable unsaturated group-containing monomer; and dispersing the fine polymer particles in the polyether-polyol; and the like. Among these processes, the latter process is preferred because there can be easily obtained a polymer-polyol in which the fine polymer particles are uniformly dispersed in the polyether-polyol.

The polymerizable unsaturated group-containing monomer includes styrene; acrylonitrile; alkyl methacrylates of which alkyl group has 1 to 4 carbon atoms, such as methyl methacrylate, ethyl methacrylate and butyl methacrylate; glycidyl methacrylate; alkyl acrylates of which alkyl group has 1 to 4 carbon atoms such as methyl acrylate, ethyl acrylate and butyl acrylate; glycidyl acrylate; and the like. Those monomers can be used alone or in admixture of at least two kinds.

The polyester-polyol is, for instance, a condensate of a polyhydric alcohol such as ethylene glycol, propylene glycol, 1,4-butanediol, diethylene glycol, neopentyl glycol or trimethylolpropane, with a polybasic acid such as phthalic acid, maleic acid, malonic acid, succinic acid, adipic acid or terephthalic acid, which has a hydroxyl group at its terminal.

In order to obtain a polyurethane foam satisfying the conditions for dynamic viscoelasticity and having sufficient strength and desired storage modulus and tan δ, the molecular weights of the polyol having two functional groups and the polyol having three functional groups and the weight ratio of these polyols can be adjusted.

The polyether-polyol having two functional groups refers to a polyether-polyol having an average number of functional groups of 2 or its modified product. The polyether-polyol having three functional groups refers to a polyether-polyol having an average number of functional groups of 3 or its modified product.

The "conditions for dynamic viscoelasticity" as referred to herein mean that storage modulus is 0.5 to 2 MPa and tan δ is 0.16 to 0.5.

For instance, when strength, storage modulus and tan δ are controlled by the polyol having two functional groups alone, it is preferable that crystallinity of the overall resin is improved by using a polyol having two functional groups having a low molecular weight so that the soft segment is more likely to be influenced by the hard segment, and that the degree of freedom is lowered. By the above procedures, the conditions for dynamic viscoelasticity can be satisfied.

When the polyol having two functional groups is used together with the polyol having three functional groups, it is preferable to increase the crystallinity of the soft segment portion near the hard segment by using a given kind of the polyol having two functional groups and controlling the molecular weight of the polyol having three functional groups and the weight ratio of the polyol having two functional groups to the polyol having three functional groups. As described above, the conditions for dynamic viscoelasticity can be satisfied by controlling the molecular weight of the polyol having three functional groups and the weight ratio of the polyol having two functional groups to the polyol having three functional groups.

The molecular weights of the polyol having two functional groups and the polyol having three functional groups and the weight ratio of the polyol having two functional groups to the polyol having three functional groups are important factors for obtaining a foamed article having a sufficient strength.

It is preferable that the polyol having two functional groups has an average number of functional groups of 1.5 to 2.5 and a number-average molecular weight of 1000 to 5000, from the viewpoint of giving sufficient strength.

The lower limit of the number-average molecular weight of the polyol having two functional groups is preferably at least 3000, more preferably at least 3200, still more preferably at least 3500, from the viewpoint of keeping mechanical strength of the polyurethane foam. The upper limit of the number-average molecular weight of the polyol having two functional groups is preferably at most 5000, more preferably at most 4800, still more preferably at most 4500, in consideration of viscosity during handling. The number-average molecular weight of the polyol having two functional groups is preferably 3000 to 5000, more preferably 3200 to 4800, still more preferably 3500 to 4500, from these viewpoints.

The polyol having two functional groups can be prepared by a process comprising using a compound having two hydroxyl groups as a starting material, subjecting the compound having two hydroxyl group to ring-opening addition reaction of at least one alkylene oxide comprising propylene oxide in a random or block form, preferably in a block form in the presence of a catalyst such as diethylzinc, iron chloride or metallic porphyrin; and adding an alkylene oxide in a random or block form to a molecular terminal of the resulting compound having two hydroxyl groups, preferably adding ethylene oxide in a block form; and the like.

Examples of the compound having two hydroxyl groups include dihydric alcohols, dihydric phenols, amines having two hydroxyl groups, alkanolamines having two hydroxyl groups and the like.

Concrete examples of the compound having two hydroxyl groups include alkylene glycols having 2 to 9 carbon atoms, such as ethylene glycol, diethylene glycol, propylene glycol, dipropylene glycol, neopentyl glycol, 1,4-butanediol, 1,5-pentanediol, 1,6-hexanediol and 1,9-nonanediol; aromatic glycols such as xylylene glycol, hydroquinone and bisphenol A; diethanolamine; dimethylolurea; modified products thereof; and the like. Those compounds can be used alone or in admixture of at least two kinds.

It is preferable that the polyol having three functional groups has an average number of functional groups of 2.5 to 3.5 and a number-average molecular weight of 2000 to 10000 from the viewpoints of improving initial reactivity, securing dimensional stability of a formed article and shortening the demolding time.

The lower limit of the number-average molecular weight of the polyether-polyol having three functional groups is preferably at least 4000, more preferably at least 4200, still more preferably at least 4500, from the viewpoint of securing dimensional stability of a polyurethane foam. The upper limit of the number-average molecular weight of the polyether-polyol having three functional groups is preferably at most 5500, more preferably at most 5300, still more preferably at most 5000, in consideration of securing dimensional stability of a polyurethane foam and viscosity during handling. The number-average molecular weight of the polyether-polyol having three functional groups is preferably 4000 to 5500, more preferably 4200 to 5300, still more preferably 4500 to 5000, from these viewpoints.

The polyol having three functional groups can be prepared by a process comprising using a compound having three hydroxyl groups as a starting material, subjecting the compound having three hydroxyl group to ring-opening addition reaction of at least one alkylene oxide comprising propylene oxide in a random or block form, preferably a block form in the presence of the above-mentioned catalyst or a catalyst such as an alkali catalyst such as sodium hydroxide or potassium hydroxide; and adding an alkylene oxide in a random or block form to the molecular terminal of the resulting compound having three hydroxyl groups, preferably adding ethylene oxide in a block form; and the like.

Examples of the compound having three hydroxyl groups include polyhydric alcohols having three hydroxyl groups, polyhydric phenols having three hydroxyl groups and the like.

Concrete examples of the compound having three hydroxyl groups include glycerol, trimethylolpropane, a modified product thereof and the like. Those compounds can be used alone or in admixture of at least two kinds.

The alkylene oxide used in the ring-opening addition reaction to the compound having two hydroxyl groups and the compound having three hydroxyl groups includes ethylene oxide, propylene oxide, 1,2-butylene oxide, 2,3-butylene oxide, styrene oxide and the like. Among them, it is preferable that propylene oxide is used alone, or propylene oxide is used as a main component (at least 50% by weight, preferably at least 65% by weight, especially preferably at least 80% by weight) together with another alkylene oxide to give a random copolymer or block copolymer. It is especially preferable that propylene oxide is used together with another alkylene oxide to give a block copolymer.

If the content of oxyethylene group existing in the polyether-polyol having two functional groups and the polyether-polyol having three functional groups becomes higher, hydrophilicity increases and moisture is attracted, so that hydrolytic resistance, which is one of the features of the polyether-based polyurethane foam, is lowered. Therefore, it is desired that each content of oxyethylene group in the polyether-polyol having two functional groups and the polyether-polyol having three functional groups is at most 35% by weight, preferably at most 20% by weight, respectively, and that each content of oxyethylene group in the polyether-polyol having two functional groups and the polyether-polyol having three functional groups is at least 5% by weight, preferably at least 8% by weight, respectively, from the viewpoint of the terminal reactivity.

The weight ratio of the polyol having two functional groups/the polyol having three functional groups is preferably 30/70 to 80/20, more preferably 35/65 to 65135, still more preferably 40/60 to 60/40, from the viewpoint of securing sufficient strength and dimensional stability of the formed article.

The upper limit of a weight ratio of the polyether-polyol having two functional groups/the polyether-polyol having three functional groups is preferably at most 65/35, more preferably at most 63/37, still more preferably at most 60/40, from the viewpoint of securing dimensional stability with the advancement of lighter weight. In addition, its lower limit is preferably at least 35/65, more preferably at least 37/63, still more preferably at least 40/60, from the viewpoint of securing elongation and flexural fatigue resistance with the advancement of lighter weight. From these viewpoints, the weight ratio of the polyether-polyol having two functional groups/the polyether-polyol having three functional groups is preferably 35/65 to 65/35, more preferably 37/63 to 63/37, still more preferably 40/60 to 60/40.

When a polyether-polyol is used as a polyol having two functional groups, it is preferable that the polyether-polyol has an average number of functional groups of 1.5 to 2.5, and a number-average molecular weight of 1500 to 4500, from the viewpoint of giving sufficient strength. In addition, when a polyester-polyol is used as a polyol having two functional groups, it is preferable that the polyester-polyol has an average number of functional groups of 1.5 to 2.5, and a number-average molecular weight of 1000 to 2500, from the viewpoints of giving sufficient strength and securing liquidity.

When a polyether-polyol is used as a polyol having three functional groups, it is preferable that the polyether-polyol has an average number of functional groups of 2.5 to 3.5, and a number-average molecular weight of 2000 to 8000, from the viewpoint of dimensional stability of the formed article. Also, when a polyester-polyol is used as a polyol having three functional groups, it is preferable that the polyester-polyol has an average number of functional groups of 2.5 to 3.5, and a number-average molecular weight of 2000 to 4000, from the viewpoint of securing dimensional stability of a formed article and liquidity of a polyether-polyol.

Among these polyols, the polyether-polyol is preferred, from the viewpoint of having both soft and excellent feel and low rebound resilience.

The total content of the polyether-polyol having two functional groups and the polyether-polyol having three functional groups in the polyol component is preferably at least 90% by weight, more preferably at least 95% by weight, still more preferably 100% by weight, from the viewpoint of obtaining a polyurethane foam being inexpensive and excellent in strength and dimensional stability in the advancement of lighter weight. Other polyol components which can be contained in the polyol component include, for instance, polyether-polyols other than the polyether-polyol having two functional groups and the polyether-polyol having three functional groups, and the like. It is preferable that the amount of these components is properly adjusted within a range which would not hinder the object of the present invention.

It is preferable that the polyol component is a mixture of the polyether-polyol having two functional groups and the polyether-polyol having three functional groups. Also, a dispersion of fine polymer particles prepared by dispersing the fine polymer particles in the mixture can be used as a polyol component as occasion demands.

Representative example of the dispersion of fine polymer particles include a dispersion of fine polymer particles prepared by dispersing fine polymer particles obtained by polymerizing a polymerizable unsaturated group-containing monomer in the above-mentioned mixture, and the like. This dispersion of fine polymer particles can be prepared by, for instance, a process comprising mixing fine polymer particles obtained by polymerizing a polymerizable unsaturated group-containing monomer with the above-mentioned mixture, and dispersing the fine polymer particles in the mixture; a process comprising polymerizing a polymerizable unsaturated group-containing monomer in the above-mentioned mixture, thereby dispersing the fine polymer particles obtained from the polymerizable unsaturated group-containing monomer in the above-mentioned mixture; and the like. Among those processes, the latter process is preferred because the dispersion of fine polymer particles in which the fine polymer particles are homogeneously dispersed in the above-mentioned mixture can be readily obtained.

The polymerizable unsaturated group-containing monomer includes styrene; acrylonitrile; alkyl methacrylates of which alkyl group has 1 to 4 carbon atoms, such as methyl methacrylate, ethyl methacrylate and butyl methacrylate; glycidyl methacrylate; alkyl acrylates of which alkyl group has 1 to 4 carbon atoms, such as methyl acrylate, ethyl acrylate and butyl acrylate; glycidyl acrylate; and the like. Those monomers can be used alone or in admixture of at least two kinds.

The content of the above-mentioned mixture in the dispersion of the fine polymer particles is not limited to specified ones. The content of the above-mentioned mixture in the dispersion is preferably at most 20% by weight, more preferably at most 10% by weight, from the viewpoints of maintaining mechanical strength and improving dimensional stability.

As the chain extender, there can be used a compound having at least two active hydrogens in its molecule, and having a number-average molecular weight of at most 1000.

Representative examples of the chain extender include polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol; aliphatic polyamines such as ethylenediamine and hexamethylenediamine; aromatic polyamines; alkanolamines such as diethanolamine, triethanolamine and diisopropanolamine; modified products thereof; and the like. Those chain extenders can be used alone or in admixture of at least two kinds.

A preferred chain extender is at least one compound selected from the group consisting of ethylene glycol, diethylene glycol, 1,4-butanediol, pentaerythritol and a modified product thereof, each number-average molecular weight of which is at most 1000.

The polyurethane foam satisfying the conditions for dynamic viscoelasticity and having sufficient strength and desired storage modulus and tan δ can be obtained by adjusting the amount of the chain extender having a low molecular weight.

In general, the chain extender reacts with an isocyanate component to form a rigid hard segment. The behavior of the dynamic viscoelasticity caused by this hard segment directly affect the conditions for dynamic viscoelasticity. Since the increase in the amount of the chain extender also increases the size and the number of the hard segments, it is assumed that this increase leads to increase in storage modulus and tan δ within the temperature range of −5° to 40° C.

However, when the amount of the chain extender is exceedingly too large, it is led to increase in hardness and storage modulus of the urethane foam and worsening in feel. Therefore, it is preferable that the amount of the chain extender is 3 to 20 parts by weight based on 100 parts by weight of the polyol, from the viewpoint of obtaining a foamed article having soft and excellent feel.

The isocyanate compound includes aromatic, alicyclic and aliphatic polyisocyanates having at least two isocyanate groups, their mixtures, modified polyisocyanate obtained by modifying these compounds, and the like.

Concrete examples of the isocyanate compound include aromatic polyisocyanates such as tolylene diisocyanate, methylenediphenyl diisocyanate, naphthylene diisocyanate, xylylene diisocyanate and polymethylenepolyphenylene diisocyanate; alicyclic polyisocyanates such as hydrogenated methylenediphenyl diisocyanate, hydrogenated tolylene diisocyanate and isophorone diisocyanate; aliphatic polyisocyanates such as hexamethylene diisocyanate and lysine diisocyanate; their mixtures; their modified products; and the like.

The modified product includes a prepolymer-type modified product which is a reaction product of the isocyanate compound with a polyol, a nurate-type modified product, a urea modified product, a carbodiimide modified product, an allophanate modified product and a biuret modified product.

Among the isocyanate compounds, the aromatic polyisocyanates and their modified products other than the polymers such as polymethylenepolyphenylene diisocyanate are preferred. Especially, those compounds containing a soft segment comprising a polyether-polyol and being formed into a prepolymer with 4,4'-diphenylmethane diisocyanate and/or their modified products (hereinafter referred to as "isocyanate prepolymer") are highly desired because the prepolymer has a structure containing a soft segment comprising a polyether-polyol and is effective in the improvement of mechanical properties of a low-density polyurethane foam.

Among the polyether-polyols, the polyoxypropylene-based polyol having a molecular weight of at least 1000 per one hydroxyl group has a long repeat of oxyalkylene chains. Therefore, the polyoxypropylene-based polyol is preferred because the polyoxypropylene-based polyol effectively acts as a soft segment in the urethane foam, so that elongation and flexural fatigue resistance of the urethane foam become excellent.

Since the polyether-polyol is previously reacted with the isocyanate compound, it is not required that the polyether-polyol has a primary hydroxyl group, and ethylene oxide may or may not be added to its terminal.

Among the isocyanate prepolymers, there may be contained a reaction product of methylenediphenyl diisocyanate or its modified product with a chain extender.

Representative examples of the polyisocyanate compound include isocyanate prepolymers and the like.

The isocyanate prepolymer can be obtained by reacting a polyisocyanate monomer with a polyol in the presence of an excess polyisocyanate monomer with stirring by a conventional method.

Concrete examples of monomer used in the polyisocyanate compound include polyisocyanate compounds such as tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenylene diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, 1,5-naphthalene diisocyanate, their modified products, such as carbodiimide modified products and the like. Those monomers can be used alone or in admixture of at least two kinds. Among them, 4,4'-diphenylmethane diisocyanate, or a combined use of 4,4'-diphenylmethane diisocyanate and its carbodiimide modified product is preferable.

Among the isocyanate prepolymers, an isocyanate prepolymer obtained by using 4,4'-diphenylmethane diisocyanate and a carbodiimide modified product of 4,4'-diphenylmethane diisocyanate is preferable from the viewpoint of securing sufficient strength.

In the prepolymer obtained by using the carbodiimide modified product of 4,4'-diphenylmethane diisocyanate, 4,4'-diphenylmethane diisocyanate may be also admixed therewith.

When the isocyanate prepolymer is prepared, there may be added an auxiliary as occasion demands.

As the above-mentioned auxiliaries, there can be used, for instance, auxiliaries which have been used in the preparation of the polyether-polyol as occasion demands, inhibitors for self-polymerization of an isocyanate prepolymer, including acid gases such as hydrogen chloride gas and sulfurous acid gas, acid chlorides such as acetyl chloride, benzoyl chloride and isophthalic acid chloride, phosphoric acid compounds such as phosphoric acid, monoethyl phosphate and diethyl phosphate, in order to inhibit self-polymerization of the isocyanate prepolymer. These auxiliaries can be used alone, or in admixture of at least two compounds.

The NCO % of the isocyanate prepolymer is preferably at least 10%, more preferably at least 15%, in order to avoid undesirably high viscosity which results in difficulties in molding with a low pressure blowing machine, and the NCO % of the isocyanate prepolymer is preferably at most 25%, more preferably at most 22%, still more preferably at most 20%, in order to avoid undesirably low viscosity which results in poor measuring accuracy in the blowing machine.

The isocyanate prepolymer is liquid at a temperature of at least 15° C. and dischargeable even at a low pressure. Therefore, the isocyanate prepolymer can be used for the production of a polyurethane foam even at a molding temperature of 40° to 50° C. without any problems.

It is preferable that the NCO % of the polyisocyanate compound is 10 to 25% from the viewpoints of the prevention of increase in liquid viscosity and storage stability of the liquid. The polyisocyanate monomer used for the polyisocyanate compound is preferably 4,4'-diphenylmethane diisocyanate from the viewpoint of obtaining a foamed article having sufficient mechanical strength.

In the present invention, it is preferable to use a catalyst from the viewpoint of improving the reaction rate.

The catalyst includes, for instance, TEDA [1,4-diazabicyclo[2.2.2]octane], N,N,N',N'-tetramethylhexamethylenediamine, N,N,N',N'-tetramethylpropylenediamine, N,N,N',N',N"-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazines, N,N,N',N'-tetramethylethylenediamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole and the like. Those catalysts can be used alone or in admixture of at least two kinds. Among the catalysts, the tertiary amines are preferable from the viewpoint of improvement in the reaction rate.

As the catalyst other than the tertiary amine, there can be also used organometallic compounds such as dibutyltin dilaurate, stannous oleate, cobalt naphthenate and lead naphthenate.

As the blowing agent used in the present invention, water is preferable. A hydrocarbon, a chlorofluorocarbon, hydrogenated fluorocarbon or like may coexist together with water. It is preferable to use water alone as the blowing agent, from the viewpoint of avoiding the depletion of ozone layer of the earth.

When water is used as a blowing agent, water generally reacts with a polyisocyanate compound to form a rigid hard segment. The behavior of dynamic viscoelasticity caused by this hard segment directly influences the conditions for dynamic viscoelasticity. Since the increased amount of water increases the size and the number of the hard segment, it is assumed that the value of tan δ is increased within the temperature range of −5° to 40° C. However, the polyurethane foam has a lower density due to carbon dioxide gas generated by the reaction of the isocyanate with water. Therefore, the amount of water would be important. From these viewpoints, the amount of water as a blowing agent is preferably 0.3 to 2 parts by weight, more preferably 0.5 to 1.8 parts by weight, still more preferably 0.9 to 1.6 parts by weight, based on 100 parts by weight of the polyol.

In the present invention, as auxiliaries, there can be used a silicone-based surfactant, a cross-linking agent, a pigment, an antioxidant, a yellowing preventive and the like.

The polyurethane foam satisfying the conditions for dynamic viscoelasticity and having sufficient strength and desired storage modulus and tan δ can be obtained by mixing a polyol, a chain extender, a polyisocyanate compound, a catalyst and a blowing agent in proper amounts to react the components, and controlling the ratio of the soft segment to the hard segment making up the polyurethane foam.

It is desired that the ratio of the polyol to the polyisocyanate compound when reacted with each other is adjusted so that the isocyanate index becomes 80 to 110, preferably 85 to 105, more preferably 90 to 100, still more preferably 82 to 95, especially preferably 85 to 90.

The polyurethane foam can be produced, for instance, by mixing a polyol component obtained by previously mixing a polyol, a chain extender, a catalyst, a blowing agent, and other auxiliaries with stirring, with a polyisocyanate compound in a molding machine; injecting the resulting mixture into a mold; and allowing the mixture to foam, and the like. More specifically, for example, the polyurethane foam can be produced by mixing the polyol component with stirring using a tank or the like and controlling the temperature usually to about 40° C., and allowing the polyol component to react with the polyisocyanate compound using a foaming machine such as an automatically mixing and injecting foaming machine or an automatically blending and injecting foaming machine.

The materials of the mold are not limited to specified ones. Examples of such materials include iron, stainless steel, copper, aluminum, aluminum alloys, epoxy resins, phenolic resins, and the like. In addition, the internal shape of the mold is not particularly limited, and any arbitrary shape can be used as long as the internal shape is a shape corresponding to the shape of a desired formed article such as a shoe sole.

When the molding is carried out, it is preferable to previously apply a mold releasing agent to the internal of the mold by a conventional method such as coating or spraying. Representative examples of the mold releasing agent include a silicone-based mold releasing agent such as dimethylsilicone oil; mineral oils; paraffin waxes; and the like, and the present invention is not limited to those exemplified ones.

There can be obtained a polyurethane foam having a given shape, for instance, a shape of a shoe sole by demolding the polyurethane foam after the molding.

In order to obtain a polyurethane foam satisfying conditions for dynamic viscoelasticity and having sufficient strength and desired storage modulus and tan δ, the density of the polyurethane foam is at least 0.1 g/cm$^3$, preferably 0.2 to 0.6 g/cm$^3$, more preferably 0.25 to 0.45 g/cm$^3$. In addition, the density of the polyurethane foam is preferably 0.1 to 0.5 g/cm$^3$, more preferably 0.2 to 0.45 g/cm$^3$, still more preferably 0.3 to 0.4 g/cm$^3$, from the viewpoints of securing sufficient mechanical strength and dimensional stability.

Also, the tensile strength is preferably at least 0.98 MPa, more preferably at least 1.18 MPa, still more preferably at least 1.47 MPa, as determined by using a test piece having a dumbbell shape No. 2 and being punched out from a polyurethane foam having a thickness of 10 mm at 25° C. in accordance with JIS K 6301, from the viewpoints of sufficient mechanical strength and durability.

Preferred applications of the polyurethane foam include shoe soles for men's shoes, women's shoes, children's shoes, sandals, sports shoes, and the like.

In general, a shoe sole comprises members classified as an outer sole used for sandals, men's shoes and the like, a midsole used for sport shoes and the like, and an inner sole inserted to the internal of the shoe. The present invention can be suitably used for these members for shoe soles. Among them, midsoles and inner soles inserted to the internal of the shoe are preferable from the viewpoint of exhibiting the effects by the foamed article.

The shoe of the present invention can be usually produced by integrating a main body of the shoe (upper or the like) and the shoe sole. The main body of the shoe is a member surrounding the instep. The material and shape of the main body are not limited to specified ones.

The case where the foamed article is a polyurethane foam is thus explained. The process for producing a foamed article having a density of at least 0.1 g/cm$^3$, a storage modulus (E') of 0.5 to 2 MPa and tan δ of 0.16 to 0.5 as obtained from dynamic viscoelasticity at a frequency of 10 Hz and a temperature of 25° C., differs depending upon the kinds of the foamed article and the like. Therefore, it is preferable that these characteristics are properly adjusted depending upon the kinds of the foamed articles.

As to the case where the foamed article of the present invention is made of a polyurethane foam, a process for producing a foamed article having the above-mentioned characteristics will be more specifically explained in detail hereinbelow.

EXAMPLES

Example I and Comparative Example I

A polyol, a chain extender, a catalyst, a blowing agent (water), a surfactant and a white pigment were mixed together to give a polyol component having the components shown in Table 1.

The ratio of the polyol component to a polyisocyanate was adjusted so that isocyanate index became the value as shown in Table 1. The isocyanate index was calculated on the basis of the equation:

[Isocyanate Index]=[Amount of Isocyanate Used]÷[Amount of Isocyanate Stoichiometrically Equivalent to Polyol]×100.

An automated blending injection foaming machine (commercially available from Polyurethane Engineering Co., Ltd., Model: MU-203S, Model No. 6-018) was charged with the polyol component and the polyisocyanate, and mixed together at a temperature of 35° to 45° C. The resulting mixture was injected into a mold (a silicone mold releasing agent being applied to its internal) at a mold temperature of 45° to 55° C., and allowed to be foamed under the following molding conditions to give a test sheet made of polyurethane foam having a size of 10 mm×100 mm×300 mm.

[Molding Conditions]

Reactivity: cream time of 5 to 15 seconds

Demolding time: 5.5 to 6.5 minutes

The abbreviations of the components used in each Example and each Comparative Example shown in Table 1 mean the followings:

[Polyol]

PO1: Polypropylene glycol [commercially available from Asahi Glass Urethane K.K. under the trade name of PREMINOL 5005, number of functional groups: 2, hydroxyl value: 28 mg KOH/g, number-average molecular weight: 4000]

PO2: Polypropylene glycol [commercially available from Asahi Glass Urethane K. K. under the trade name of EXENOL 540, number of functional groups: 2, hydroxyl value: 56 mg KOH/g, number-average molecular weight: 2000]

PI2: Commercially available from Kao Corporation under the trade name of EDDYFOAM B-2009 (NCO %: 18.5%, isocyanate used in isocyanate prepolymer: 4,4'-diphenylmethane diisocyanate)

[Chain Extender]

CE1: Ethylene Glycol

CE2: Diethylene Glycol

CE3: Modified product of pentaerythritol (commercially available from Sanyo Chemical Industries, Ltd. under the trade name of SUNNIX HD-402, number of functional groups: 4, hydroxyl value: 405 mg KOH/g, number-average molecular weight: 550)

[Catalyst]

Triethylenediamine

[Surfactant]

Commercially available from Dow Corning Toray Silicone Co., Ltd. under the trade name of SRX-253

[White Pigment]

Commercially available from DAINICHISEIKA COLOR & CHEMICALS MFG. CO., LTD. under the trade name of FTR White

TABLE 1

| | Polyol Component (Parts by Weight) | | | | | | | | | | | | |
|---|---|---|---|---|---|---|---|---|---|---|---|---|---|
| | Polyol | | | | Chain Extender | | | | Blowing Agent | | White | Kind of Polyisocyanate | Isocyanate |
| | PO1 | PO2 | PO3 | PO4 | CE1 | CE2 | CE3 | Catalyst | (Water) | Surfactant | Pigment | Compound | Index |
| Ex. No. | | | | | | | | | | | | | |
| I-1 | 60 | — | 40 | — | 8.5 | 0.3 | — | 0.6 | 1.5 | 1.0 | 2.0 | PI1 | 95 |
| I-2 | — | — | — | 100 | — | 10.8 | — | 0.6 | 0.7 | 1.0 | 2.0 | PI2 | 95 |
| I-3 | 60 | — | 40 | — | 6.0 | 0.3 | — | 0.6 | 1.3 | 1.0 | 2.0 | PI1 | 96 |
| I-4 | — | 100 | — | — | 8.5 | — | — | 0.7 | 0.7 | 1.0 | 2.0 | PI1 | 97 |
| I-5 | 100 | — | — | — | — | 10 | — | 0.6 | 0.7 | 1.0 | 2.0 | PI1 | 97 |
| I-6 | 100 | — | — | — | 8.5 | — | — | 0.6 | 1.3 | 1.0 | 2.0 | PI1 | 96 |
| I-7 | 60 | — | 40 | — | 6.0 | 0.3 | 3.0 | 0.6 | 1.3 | 1.0 | 2.0 | PI1 | 95 |
| I-8 | 20 | — | 80 | — | 4.0 | — | 10.0 | 0.7 | 1.3 | 1.0 | 2.0 | PI1 | 85 |
| I-9 | 60 | — | 40 | — | 8.0 | 0.3 | 10.0 | 0.7 | 0.4 | 1.0 | 2.0 | PI1 | 85 |
| I-10 | 50 | — | 30 | — | 5.3 | — | 20.0 | 0.7 | 0.5 | 1.0 | 2.0 | PI1 | 85 |
| Comp. Ex. No. | | | | | | | | | | | | | |
| I-1 | 60 | — | 40 | — | 8.3 | — | — | 0.6 | 0.7 | 1.0 | 2.0 | PI1 | 95 |
| I-2 | 80 | — | 20 | — | 8.3 | — | — | 0.6 | 0.7 | 1.0 | 2.0 | PI1 | 97 |
| I-3 | — | — | — | 100 | 8.3 | — | — | 0.7 | 0.7 | 1.0 | 2.0 | PI2 | 97 |
| I-4 | — | — | — | 100 | 8.3 | — | — | 0.6 | 0.7 | 1.0 | 2.0 | PI2 | 96 |
| I-5 | — | 60 | 40 | — | 8.3 | — | — | 0.6 | 0.7 | 1.0 | 2.0 | PI1 | 96 |

PO3: Polypropylene triol [commercially available from Asahi Glass Urethane K.K. under the trade name of EXENOL 820, number of functional groups: 3, hydroxyl value: 34 mg KOH/g, number-average molecular weight: 4900]

PO4: Polyester-polyol [starting monomers: ethylene glycol, 1,4-butanediol and adipic acid, ethylene glycol/1,4-butanediol (weight ratio)=1/1, number of functional groups: 2, hydroxyl value: 86 mg KOH/g, number-average molecular weight: 1300]

[Polyisocyanate]

PI1: Commercially available from Kao Corporation under the trade name of EDDYFOAM B-6106M (NCO %: 16.0%, isocyanate used in isocyanate prepolymer: 4,4'-diphenylmethane diisocyanate)

Figure 2:
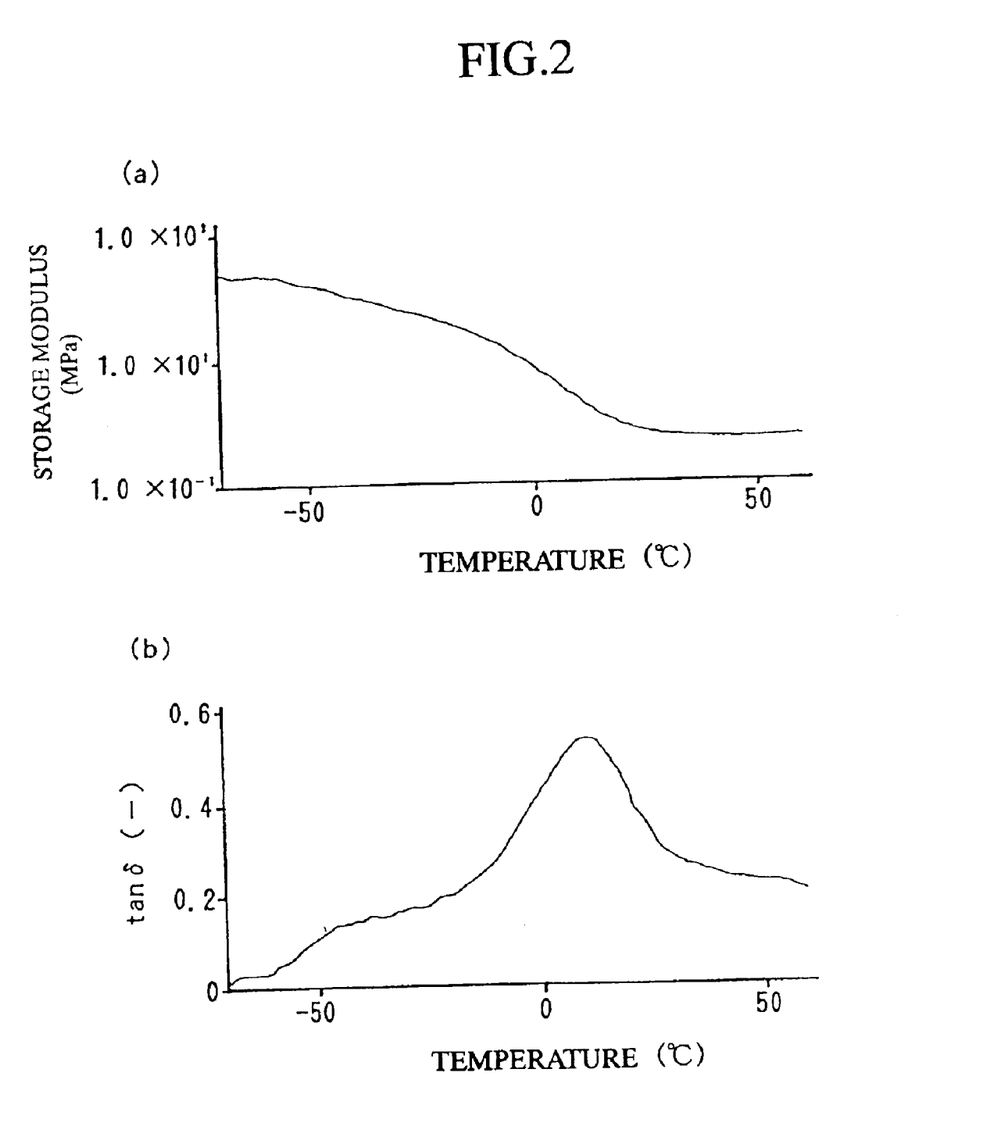
FIG. 2(a) is a graph showing temperature change in storage modulus of a test sheet obtained in Example I-7 of the present invention.
FIG. 2(b) is a graph showing temperature change in tan δ of a test sheet obtained in Example I-7 of the present invention.

Each test sheet prepared was evaluated for temperature change of storage modulus and tan δ, with varying its temperature from −70° to 60° C. As one example, the results of determinations of the temperature changes of the storage modulus and tan δ for the test sheet obtained in Example I-7 are shown in FIG. 2. In FIG. 2, (a) is a graph showing the temperature change of storage modulus, and (b) is a graph showing the temperature change of tan δ. It can be seen from this graph showing the temperature change of tan δ, that the peak value of tan δ is 11° C.

Next, the physical properties of the prepared test sheet were evaluated in accordance with the following methods. The results are shown in Table 2.

(1) Storage Modulus and Tan δ

Dynamic viscoelasticity was determined by using a dynamic viscoelasticity analyzer DVA-225 commercially available from IT Keisoku Seigyo K.K. using a rectangular parallelepiped sample having a length of 30 mm and a cross section of 5 mm×10 mm, which was produced by cutting the prepared test sheet at a programming rate of 2° C./minute and frequency of 10 Hz on the basis of the test method of JIS K 7198. The determination was initiated from the temperature of minus 100° C. Storage modulus and tan δ were obtained at 25° C. from the data obtained.

(2) Density

Density was determined by weighing a test sheet (100 mm×300 mm×10 mm), and dividing the weight of the test sheet by its volume 300 $cm^3$.

(3) Hardness

Hardness of the surface of the test sheet was determined by using Asker C hardness meter at 25° C.

(4) Tensile Strength, Tear Strength and Elongation

Each of tensile strength, tear strength and elongation was determined in accordance with JIS K 6301 using a test piece punched out from a test sheet, having a dumbbell shape No. 2.

(5) Modulus of Repulsion Elasticity

Modulus of repulsion elasticity was determined in accordance with JIS K 6301 using a test piece punched out from a test sheet, having a diameter of 32 mm (thickness 10 mm).

(6) Feel

Feel of a polyurethane foam having a thickness of 10 mm was evaluated by touching with a finger at 25° C. The case where feel is soft is indicated by S, and the case where feel is hard is indicated by H.

storage modulus, so that soft and excellent feel is not obtained. These facts are also clear from the values of hardness (Asker C).

While the polyurethane foam obtained in Comparative Example I-3 has soft and excellent feel, low rebound resilience is not obtained.

The amounts of the polyol, the chain extender, the catalyst, the pigment and the surfactant used in the polyurethane foam obtained in Example I-1 are almost equal to those used in Comparative Example I-1. However, since the amount of water used as a blowing agent used in Example I-1 is different from that used in Comparative Example I-1, storage modulus and tan δ are different with each other. In general, water reacts with an isocyanate component to form a rigid hard segment. Since the size and number of hard segments used in Example I-1 become larger than those used in Comparative Example I-1, it is assumed that the polyurethane foam obtained in Example I-1 has a value of tan δ under the conditions for dynamic viscoelasticity. Also, the increase of the amount of water increases an expansion ratio of a foam, and the density is lowered. Therefore, it is thought that the amount of polyurethane foam per unit volume is lowered, and that storage modulus is lowered according to Example I-1.

Example II and Comparative Example II

Polyether-polyols shown in Table 3 were used to have the components shown in Table 3.

There were mixed ethylene glycol as a chain extender, TEDA as a catalyst, a polyalkyl siloxane [commercially available from Dow Corning Toray Silicone Co., Ltd. under

TABLE 2

| | Storage Modulus (MPa) | tan δ | Peak Temperature of Glass Transition Temperature (° C.) | Peak Value of tan δ (–) | Density (g/$cm^3$) | Hardness (Asker C) | Tensile Strength (MPa) | Tear Strength (kN/m) | Elongation (%) | Modulus of Repulsion Elasticity (%) | Feel |
|---|---|---|---|---|---|---|---|---|---|---|---|
| Ex. No. | | | | | | | | | | | |
| I-1 | 1.1 | 0.22 | 3 | 0.33 | 0.3 | 58 | 2.1 | 12.5 | 400 | 18 | S |
| I-2 | 0.9 | 0.17 | 1 | 0.90 | 0.5 | 47 | 4.2 | 12.6 | 470 | 29 | S |
| I-3 | 0.7 | 0.19 | 0 | 0.39 | 0.3 | 40 | 1.6 | 9.6 | 420 | 20 | S |
| I-4 | 1.9 | 0.21 | 0 | 0.63 | 0.5 | 60 | 3.4 | 17.2 | 530 | 31 | S |
| I-5 | 1.1 | 0.29 | 6 | 0.56 | 0.5 | 60 | 3.5 | 17.6 | 480 | 32 | S |
| I-6 | 1.5 | 0.20 | 4 | 0.31 | 0.3 | 51 | 1.9 | 11.7 | 420 | 25 | S |
| I-7 | 0.6 | 0.34 | 11 | 0.53 | 0.3 | 39 | 1.7 | 9.9 | 400 | 13 | S |
| I-8 | 1.2 | 0.45 | 20 | 0.46 | 0.3 | 45 | 1.0 | 6.5 | 290 | 10 | S |
| I-9 | 2.0 | 0.25 | −1 | 0.44 | 0.5 | 63 | 2.9 | 16.2 | 430 | 25 | S |
| I-10 | 1.4 | 0.50 | 12 | 0.71 | 0.5 | 53 | 2.0 | 7.9 | 300 | 17 | S |
| Comp. Ex. No. | | | | | | | | | | | |
| I-1 | 2.6 | 0.18 | −13 | 0.32 | 0.5 | 72 | 3.5 | 22.2 | 500 | 38 | H |
| I-2 | 3.2 | 0.17 | −10 | 0.30 | 0.5 | 76 | 4.1 | 19.6 | 470 | 37 | H |
| I-3 | 1.3 | 0.12 | −6 | 0.60 | 0.3 | 53 | 3.1 | 14.3 | 420 | 40 | S |
| I-4 | 2.8 | 0.13 | −5 | 0.60 | 0.5 | 75 | 6.1 | 24.3 | 430 | 41 | H |
| I-5 | 2.3 | 0.24 | 4 | 0.47 | 0.5 | 68 | 3.3 | 16.3 | 450 | 30 | H |

It can be seen from the results shown in Table 2 that since the polyurethane foam obtained in each Example has a density of at least 0.1 g/$cm^3$, storage modulus obtained from dynamic viscoelasticity of 0.5 to 2 MPa at a frequency of 10 Hz and a temperature of 25° C., and tan δ of 0.16 to 0.5, the polyurethane foam simultaneously has soft and excellent feel and low rebound resilience.

On the other hand, the polyurethane foams obtained in Comparative Examples I-1, I-2, I-4 and I-5 have high the trade name of SRX253] as a surfactant, water as a blowing agent, a pigment [commercially available from DAINICHISEIKA COLOR & CHEMICALS MFG. CO., LTD. under the trade name of FTR 610 White] and urea as an auxiliary as occasion demands, with stirring, and these amounts were adjusted to the amounts as shown in Table 3 per 100 parts by weight of the polyether-polyol to give a polyol component.

As an isocyanate compound, there was used an isocyanate prepolymer [commercially available from Kao Corporation under the trade name of EDDYFOAM B-6106M, NCO %: 16%].

The ratio of the polyol solution to the isocyanate compound was determined in consideration of the free foam during the foaming reaction, and the ratio was adjusted so that isocyanate index became 85 to 88, as obtained in accordance with the equation:

[Isocyanate Index]=[Amount of Isocyanate Used]÷[Amount of Isocyanate Stoichiometrically Equivalent to Polyol]×100.

One tank of the pouring-type low-pressure foaming machine was charged with the polyol component, and the liquid temperature was adjusted to 35° to 45° C. The other tank was charged with the isocyanate compound, and the liquid temperature was also adjusted to 35° to 45° C. The polyol component was mixed with the isocyanate compound with stirring using this foaming machine, and the mixture was injected into a mold, and allowed to be foamed under the following molding conditions to give a test sheet made of a polyurethane foam having a size of 100 mm×300 mm×10 mm.

[Molding Conditions]
Reactivity: cream time of 5 to 15 seconds
Demolding time: 5.5 to 6.5 minutes Physical properties of the obtained test sheet were evaluated in accordance with the following methods. The results are shown in Table 3.

The abbreviations for the polyether-polyols shown in Table 3 mean the followings:

[Polyether-Polyol]

A1: Polypropylene glycol [commercially available from Asahi Glass Urethane K.K. under the trade name of PREMINOL 5005, number of functional groups: 2, hydroxyl value: 28 mg KOH/g, number-average molecular weight: 4000, degree of unsaturation: 0.02 meq/g]

B1: Polypropylene triol [commercially available from Asahi Glass Urethane K.K. under the trade name of EXENOL 845, number of functional groups: 3, hydroxyl value: 28.5 mg KOH/g, number-average molecular weight: 5900, degree of unsaturation: 0.08 meq/g]

B2: Polypropylene triol [commercially available from Asahi Glass Urethane K.K. under the trade name of EXENOL 820, number of functional groups: 3, hydroxyl value: 34 mg KOH/g, number-average molecular weight: 4900, degree of unsaturation: 0.06 meq/g]

B3: Polypropylene triol [commercially available from Asahi Glass Urethane K.K. under the trade name of EXENOL 230, number of functional groups: 3, hydroxyl value: 56 mg KOH/g, number-average molecular weight: 3000, degree of unsaturation: 0.03 meq/g]

[Physical Properties of Urethane Foam]

1. Density

Density was determined by weighing a test sheet (100 mm×300 mm×10 mm), and dividing the weight of the test sheet by its volume 300 cm$^3$.

2. Hardness

Hardness of the surface of the test sheet was determined by using Asker C hardness meter at 25° C.

3. Tensile Strength, Tear Strength and Elongation

Each of tensile strength, tear strength and elongation was determined in accordance with JIS K 6301 using a test piece having a dumbbell shape No. 2, punched out from a test sheet.

4. Dimensional Change

The compounds shown in Table 3 were used, and the amounts of the polyol components were adjusted to the components shown in Table 3. Thereafter, a midsole formed article 1 for shoe soles shown in FIG. 3 was produced. After 24 hours passed from demolding, the dimensions for the formed article at given positions +e,crc +b 1 +ee to +e,crc +b 0 +ee shown in FIG. 3 were measured. The absolute value of the difference of the measured dimensions from those of the actual dimensions of the mold at each corresponding position was obtained as a dimensional change. The dimensions of the formed article at the given positions +e,crc +b 1 +ee to +e,crc +b 3 +ee were measured at an upper end of the sole in the surrounding of the midsole formed article 1 for shoe soles.

5. Total Amount of Dimensional Change

Figure 3:
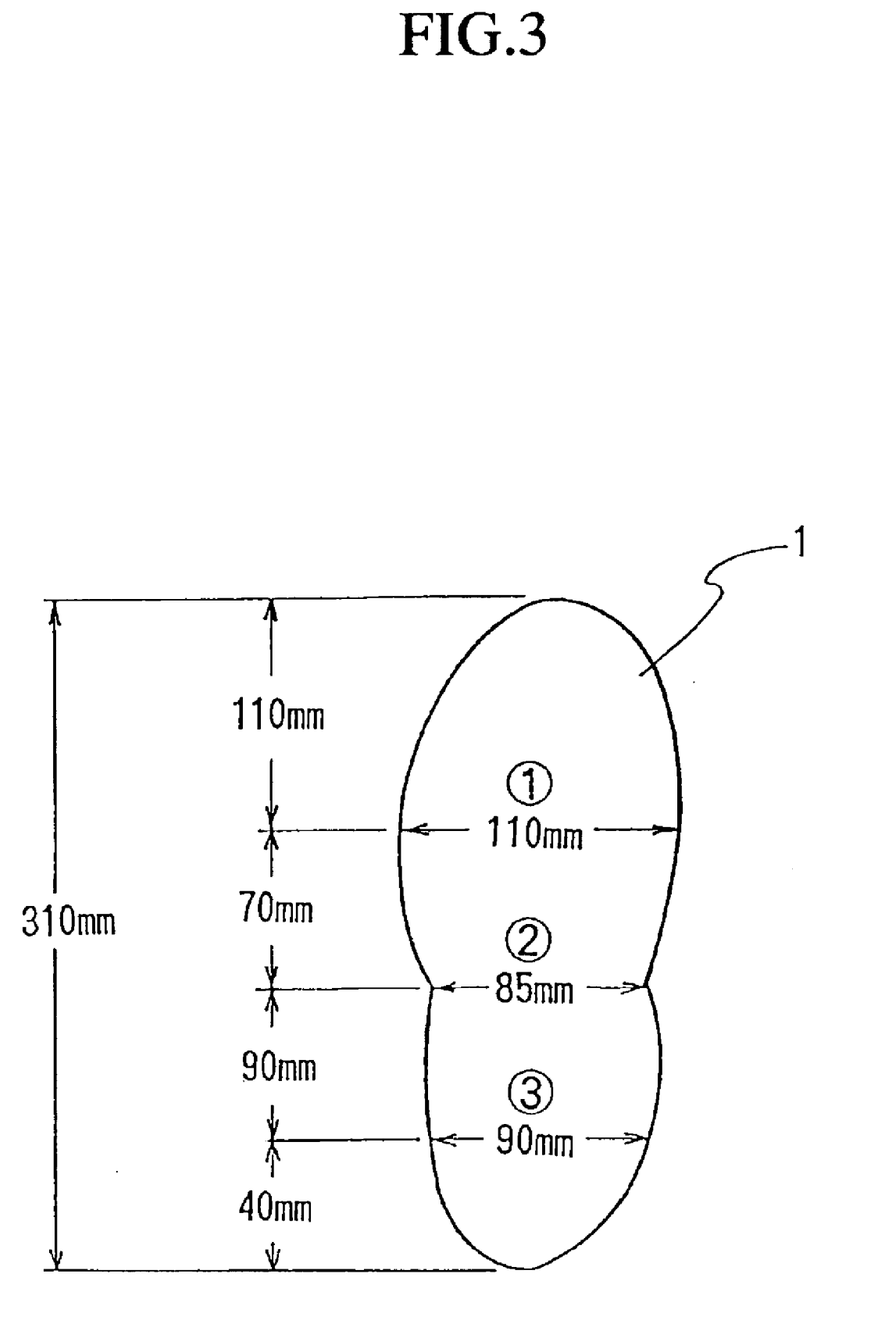
FIG. 3 is a schematic view showing the shape of a midsole used in Example II and Comparative Example II.

The total sum of the dimensional change in the given positions +e,crc +b 1 +ee to +e,crc +b 3 +ee of the midsole formed article 1 for shoe soles as shown in FIG. 3 was obtained. This sum was defined as a total amount of dimensional change.

6. Evaluation for Dimensional Stability

The case where the total amount of dimensional change is at most 7 mm was evaluated as ○ (excellent dimensional stability), and the case where the total amount of dimensional change is at least 7 mm was evaluated as x (failure in dimensional stability).

TABLE 3

| | Polyol Component (Parts by Weight) | | | | | | | | | | |
|---|---|---|---|---|---|---|---|---|---|---|---|
| | Polyether-Polyol | | | | Chain | | | | Blowing | | Isocyanate |
| | A1 | B1 | B2 | B3 | Extender | Catalyst | Surfactant | Auxiliary | Agent | Pigment | Index |
| Ex. No. | | | | | | | | | | | |
| II-1 | 40 | 0 | 60 | 0 | 8.6 | 0.6 | 1 | 0 | 1.5 | 2 | 87 |
| II-2 | 50 | 0 | 50 | 0 | 8.6 | 0.6 | 1 | 0 | 1.5 | 2 | 88 |
| II-3 | 60 | 0 | 40 | 0 | 8.6 | 0.6 | 1 | 0.1 | 1.5 | 2 | 88 |
| II-4 | 60 | 0 | 40 | 0 | 8.2 | 0.6 | 1 | 0 | 1.3 | 2 | 87 |
| II-5 | 60 | 0 | 40 | 0 | 5.7 | 0.6 | 1 | 0 | 1.5 | 2 | 87 |
| Comp. Ex. No. | | | | | | | | | | | |
| II-1 | 30 | 0 | 70 | 0 | 8.6 | 0.6 | 1 | 0 | 1.5 | 2 | 85 |
| II-2 | 70 | 0 | 30 | 0 | 8.6 | 0.6 | 1 | 0 | 1.5 | 2 | 86 |
| II-3 | 50 | 50 | 0 | 0 | 8.6 | 0.6 | 1 | 0 | 1.5 | 2 | 88 |
| I-4 | 50 | 0 | 0 | 50 | 8.6 | 0.6 | 1 | 0 | 1.5 | 2 | 87 |
| I-5 | 100 | 0 | 0 | 0 | 8.6 | 0.7 | 1 | 0 | 1.3 | 2 | 88 |

TABLE 3-continued

| | Physical Properties | | | | | | | Total Amount of Dimensional Change (mm) | Evaluation of Dimensional Stability |
|---|---|---|---|---|---|---|---|---|---|
| | Density of Formed Article (g/cm³) | Hardness (Asker C) | Tensile Strength (MPa) | Tear Strength (kN/m) | Elongation (%) | Dimensional Change (mm) | | | |
| | | | | | | Part ① in FIG. 3 | Part ② in FIG. 3 | Part ③ in FIG. 3 | |

| Ex. No. | | | | | | | | | |
|---|---|---|---|---|---|---|---|---|---|
| II-1 | 0.3 | 55 | 1.83 | 9.62 | 330 | 1.8 | 3.4 | 0.9 | 6.1 | ○ |
| II-2 | 0.3 | 54 | 1.84 | 10.01 | 385 | 2 | 3.6 | 0.9 | 6.5 | ○ |
| II-3 | 0.3 | 55 | 1.87 | 10.53 | 370 | 2.2 | 3.4 | 0.7 | 6.3 | ○ |
| II-4 | 0.35 | 58 | 2.08 | 11.05 | 420 | 1.5 | 3.1 | 0.9 | 5.5 | ○ |
| II-5 | 0.35 | 40 | 1.62 | 8.9 | 450 | 1.6 | 2.8 | 0.8 | 5.2 | ○ |
| Comp. Ex. No. | | | | | | | | | |
| II-1 | 0.3 | 59 | 1.66 | 7.8 | 290 | 5.3 | 6.1 | 1.6 | 13 | X |
| II-2 | 0.3 | 54 | 2.01 | 10.8 | 390 | 6.2 | 4.9 | 1.8 | 12.9 | X |
| II-3 | 0.3 | 55 | 1.92 | 10.67 | 380 | 5.5 | 5.2 | 1.8 | 12.5 | X |
| II-4 | 0.3 | 56 | 1.83 | 8.94 | 350 | 5 | 4.9 | 1.2 | 11.1 | X |
| II-5 | 0.3 | 51 | 2.04 | 12.1 | 410 | 4.8 | 4.6 | 1.3 | 10.7 | X |

The influence based on the molecular weight of the polyether-polyol having three functional groups was examined by using the same kind and amount of the polyether-polyol having two functional groups. As a result, as is clear from the results shown in Example II-2 and Comparative Examples II-3 and II-4, it can be seen that there exists an optimum molecular weight in the polyether-polyol having three functional groups from the facts that a marked difference in dimensional change after molding is observed.

Also, when the weight ratio of the polyether-polyol having two functional groups to the polyether-polyol having three functional groups is changed, as is clear from the results shown in Examples II-1, II-2 and 11-4 and Comparative Examples II-1 and II-2, it can be seen that there exists an optimum ratio of the polyether-polyol having two functional groups to the polyether-polyol having three functional groups from the facts that a marked difference in dimensional change after molding is observed.

In addition, it can be seen from the results of Examples II-4 and II-5 that hardness of the polyurethane can be easily changed with maintaining dimensional stability and mechanical strength by properly adjusting the amount of the chain extender.

It can be seen from the results shown in Comparative Example II-5 that when the polyether-polyol having two functional groups is solely used at a low density, dimensional stability is lowered while suitable mechanical strength is obtained.

The foamed article of the present invention exhibits the effects such that the foamed article has sufficient strength and simultaneously satisfies soft and excellent feel and low rebound resilience. Therefore, the foamed article can be especially suitably used as a foamed article for shoe soles.

According to the process of the present invention, there can be productively obtained a polyurethane foam which has sufficient strength and is excellent in dimensional stability even at a low density by using an inexpensive and widely used polyether-polyol as a raw material. Since the polyurethane foam can make the weight of shoes lighter, the polyurethane foam can be suitably used as a polyurethane foam for shoe soles.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyurethane foam having a density of at least 0.1 g/cm³, a single glass transition temperature within the temperature range of −20° to 60° C., a storage modulus (E') of 0.5 to 2 MPa and tan δ of 0.16 to 0.5 as obtained from dynamic viscoelasticity at a frequency of 10 Hz and a temperature of 25° C., and wherein said polyurethane foam does not have a glass transition temperature below −20° C.,
   said polyurethane foam being obtained by reacting a polyol component comprising a polyether-polyol having two functional groups and a number-average molecular weight of 3000 to 5000 and a polyether-polyol having three functional groups and a number-average molecular weight of 4000 to 5500 with an isocyanate compound, wherein the weight ratio of polyether-polyol having two functional groups/the polyether-polyol having three functional groups is 35/65 to 65/35.

2. The polyurethane foam according to claim 1, wherein the polyurethane foam is obtained by mixing (a) said polyol component, (b) a chain extender, (c) a polyisocyanate compound,(d) a catalyst and(e) a blowing agent, and reacting the resulting mixture.

3. The polyurethane foam according to claim 2, wherein the polyisocyanate compound is an isocyanate prepolymer obtained by using 4,4'-diphenylmethane diisocyanate or a carbodjimide modified product of 4,4'-diphenylmethane diisocyanate.

4. The polyurethane foam according to claim 1, wherein the polyurethane foam has a tensile strength of at least 0.98 MPa.

5. The polyurethane foam according to claim 1, wherein the polyurethane foam has a modulus of repulsion elasticity of 10 to 35%.

6. The polyurethane foam according to claim 1, wherein the polyurethane foam is a foamed article for shoe soles.

7. A member for shoe soles, which is made of the polyurethane foam of any one of claims 1 to 6.

8. A shoe sole comprising the polyurethane foam of any one of claims to 1 to 6.

9. A shoe having a shoe sole comprising the polyurethane foam of any one of claims 1 to 6.

10. A process for preparing a polyurethane foam comprising:

reacting a polyol component comprising a polyether-polyol having two functional groups and a number-average molecular weight of 3000 to 5000 and a polyether-polyol having three functional groups and a number-average molecular weight of 4000 to 5500 with an isocyanate compound, wherein the weight ratio of polyether-polyol having two functional groups/the polyether-polyol having three functional groups is 35/65 to 65/35; and wherein said polyurethane foam has a density of at least 0.1 g/cm$^3$, a single glass transition temperature within the temperature range of −20° to 60° C., a storage modulus (E') of 0.5 to 2 MPa and tan δ of 0.16 to 0.5 as obtained from dynamic viscoelasticity at a frequency of 10 Hz and a temperature of 25° C., and said polyurethane foam does not have a glass transition temperature below −20° C.

11. The process according to claim 10, wherein the isocyanate compound is a prepolymer having a soft segment comprising a polyether-polyol, prepolymerized with 4,4'-diphenylmethane diisocyanate and/or its modified product.

12. The process according to claim 10, wherein the isocyanate compound has an NCO % of 10 to 25%.

13. A polyurethane foam obtained by the process of any one of claims 10 to 12.

* * * * *